(12) United States Patent  (10) Patent No.: US 7,411,307 B2
Uno  (45) Date of Patent: Aug. 12, 2008

(54) APPARATUS FOR PROVIDING ELECTRICAL SIGNALS TO BICYCLE COMPONENTS

(75) Inventor: Koji Uno, Osaka (JP)

(73) Assignee: Shimano, Inc., Sakai-ku, Sakai, Osaka (JP)

( * ) Notice: Subject to any disclaimer, the term of this patent is extended or adjusted under 35 U.S.C. 154(b) by 311 days.

(21) Appl. No.: 10/711,560

(22) Filed: Sep. 24, 2004

(65) Prior Publication Data

US 2005/0067203 A1    Mar. 31, 2005

(30) Foreign Application Priority Data

Sep. 30, 2003    (JP)    ............................. 2003-339134

(51) Int. Cl.
| | |
|---|---|
| *F02B 63/04* | (2006.01) |
| *F03G 7/08* | (2006.01) |
| *H02K 7/18* | (2006.01) |
| *F16M 1/00* | (2006.01) |
| *F16M 3/00* | (2006.01) |
| *F16M 5/00* | (2006.01) |
| *F16M 7/00* | (2006.01) |
| *F16M 9/00* | (2006.01) |
| *F16M 11/00* | (2006.01) |

(52) U.S. Cl. ...................................... 290/1 R; 248/689
(58) Field of Classification Search ................. 290/1 R; 248/689

See application file for complete search history.

(56) References Cited

U.S. PATENT DOCUMENTS

| 4,069,451 | A | | 1/1978 | Rouse | ............................. 322/1 |
| 4,823,036 | A | | 4/1989 | Roberts | ....................... 310/237 |
| 4,942,936 | A | * | 7/1990 | Gardner, Jr. | .................. 180/207 |
| 4,961,719 | A | * | 10/1990 | Wildermuth | ................. 474/50 |
| 5,015,918 | A | * | 5/1991 | Copeland | ...................... 315/76 |
| 5,237,263 | A | * | 8/1993 | Gannon | ....................... 323/288 |
| 5,247,430 | A | | 9/1993 | Schwaller | .................... 362/473 |
| 5,368,122 | A | * | 11/1994 | Chou | .......................... 180/220 |
| 5,433,284 | A | * | 7/1995 | Chou | .......................... 180/205 |
| 5,483,137 | A | | 1/1996 | Fey et al. | ....................... 607/28 |
| 5,551,315 | A | * | 9/1996 | Pikoulas | ..................... 74/502.2 |
| 5,599,244 | A | * | 2/1997 | Ethington | ..................... 474/70 |
| 5,681,234 | A | * | 10/1997 | Ethington | ..................... 474/70 |
| 5,728,017 | A | * | 3/1998 | Bellio et al. | ................... 474/70 |
| 5,820,394 | A | * | 10/1998 | Kameyama et al. | ......... 439/248 |
| 5,865,454 | A | * | 2/1999 | Campagnolo | ............... 280/238 |
| 5,947,759 | A | * | 9/1999 | Kameyama et al. | ......... 439/248 |

(Continued)

FOREIGN PATENT DOCUMENTS

CN    2126195 U    12/1992

(Continued)

OTHER PUBLICATIONS

5 pages of documents downloaded from a Japanese web site, published on or before Sep. 3, 2003 on the Internet.

*Primary Examiner*—Darren Schuberg
*Assistant Examiner*—Pedro J Cuevas
(74) *Attorney, Agent, or Firm*—James A. Deland (57) ABSTRACT

An electrical power distribution apparatus for a bicycle comprises a housing adapted to be mounted to the bicycle, a regulator supported by the housing to receive power from a power supply, and an output disposed on the housing to supply regulated power provided by the regulator to a plurality of electrical components external to the housing.

44 Claims, 9 Drawing Sheets

U.S. PATENT DOCUMENTS

| | | | | |
|---|---|---|---|---|
| 6,012,353 | A | | 1/2000 | Kawakami ................. 74/502.2 |
| 6,047,230 | A | * | 4/2000 | Spencer et al. ................ 701/57 |
| 6,094,122 | A | * | 7/2000 | Sexton ......................... 336/96 |
| 6,144,125 | A | * | 11/2000 | Birkestrand et al. ........ 310/68 B |
| 6,146,297 | A | * | 11/2000 | Kimura ........................ 474/78 |
| 6,148,262 | A | * | 11/2000 | Fry ............................ 701/213 |
| 6,192,300 | B1 | * | 2/2001 | Watarai et al. .................. 701/1 |
| 6,216,078 | B1 | * | 4/2001 | Jinbo et al. ................... 701/70 |
| 6,418,041 | B1 | * | 7/2002 | Kitamura .................... 363/125 |
| 6,418,360 | B1 | * | 7/2002 | Spivey et al. ................. 701/29 |
| 6,446,745 | B1 | * | 9/2002 | Lee et al. .................... 180/206 |
| 6,646,400 | B2 | * | 11/2003 | Uno ............................ 318/479 |
| 6,724,299 | B2 | * | 4/2004 | Takeda et al. ................ 340/432 |
| 6,741,045 | B2 | * | 5/2004 | Kitamura ..................... 318/14 |
| 7,015,598 | B2 | * | 3/2006 | Oohara ......................... 307/47 |
| 7,059,989 | B2 | * | 6/2006 | Fukui .......................... 475/149 |
| 7,145,256 | B2 | * | 12/2006 | Koharcheck et al. ........ 290/1 R |
| 7,168,991 | B2 | * | 1/2007 | Sano ........................... 439/660 |
| 7,204,623 | B2 | * | 4/2007 | Uno ............................ 362/473 |
| 7,205,745 | B2 | * | 4/2007 | Murashige et al. .......... 320/101 |
| 7,342,321 | B2 | * | 3/2008 | Kitamura .................... 290/1 R |
| 2001/0027495 | A1 | * | 10/2001 | Campagnolo ............... 709/248 |
| 2001/0040204 | A1 | * | 11/2001 | Irie ........................... 248/230.1 |
| 2001/0046916 | A1 | * | 11/2001 | Fujii ........................... 474/144 |
| 2002/0064995 | A1 | | 5/2002 | Nishimoto ................... 439/606 |
| 2004/0013938 | A1 | * | 1/2004 | Murashige et al. ............ 429/96 |
| 2004/0115962 | A1 | | 6/2004 | Kitamura et al. .............. 439/34 |
| 2005/0066875 | A1 | * | 3/2005 | Chen .......................... 116/200 |
| 2005/0067203 | A1 | * | 3/2005 | Uno ........................... 180/65.5 |
| 2006/0252291 | A1 | * | 11/2006 | Sano ........................... 438/157 |
| 2007/0077828 | A1 | * | 4/2007 | Kurahashi ................... 439/936 |

FOREIGN PATENT DOCUMENTS

| | | | |
|---|---|---|---|
| CN | 1311561 A | | 9/2001 |
| DE | 299 15 125 U1 | | 9/2000 |
| EP | 1394031 A2 | | 3/2004 |
| GB | 2126438 A | | 3/1984 |
| GB | 2355868 A | | 5/2001 |
| JP | 5-072685 U | | 10/1993 |
| JP | 8-207854 A | | 8/1996 |
| JP | 2001122175 A | * | 5/2001 |
| JP | 3094197 U | | 3/2003 |
| JP | 2003-118671 A | | 4/2003 |

* cited by examiner

APPARATUS FOR PROVIDING ELECTRICAL SIGNALS TO BICYCLE COMPONENTS

BACKGROUND OF THE INVENTION

The present invention is directed to bicycles and, more particularly, to an apparatus for providing electrical signals to bicycle components.

In recent years, bicycles have been equipped with a number of electrical devices in order to meet various user requirements. Examples include lights, display devices, cell phone chargers, and the like. Such devices have different power needs, so it is necessary to supply different predetermined levels of power to each of the devices. One possibility is to use a separate battery for each device. However, such batteries add to the bulk and weight of the various components and also create the inconvenience of having to replace the batteries periodically. One solution to this problem is to supply each of the electrical components with its required power from a dynamo. However, since each electrical component has its own power needs, it has been necessary to provide a separate dynamo on the bicycle for each electrical component. For example, where a light and a cell phone charger are installed on a bicycle, both a dynamo for the light and a dynamo for the cell phone charger also must be installed on the bicycle. Of course, as the number of electrical components increases, the number of dynamos that must be mounted to the bicycle increases accordingly. Thus, as a practical matter, the number of electrical components that a rider can use on a bicycle is limited. Also, since a dynamo uses rotation of the bicycle wheel to generate electricity, adding dynamos correspondingly increases the pedaling effort on the rider. This can create unstable operation of the bicycle as well as unstable levels of power provided to the electrical components.

SUMMARY OF THE INVENTION

The present invention is directed to various features of an apparatus for providing electrical signals to bicycle components. In one embodiment, an electrical power distribution apparatus is provided for a bicycle, wherein the apparatus comprises a housing adapted to be mounted to the bicycle, a regulator supported by the housing to receive power from a power supply, and an output disposed on the housing to supply regulated power provided by the regulator to a plurality of electrical components external to the housing. Additional inventive features will become apparent from the description below, and such features may be combined with the above features to provide additional benefits.

DETAILED DESCRIPTION OF THE EMBODIMENTS

Figure 1:
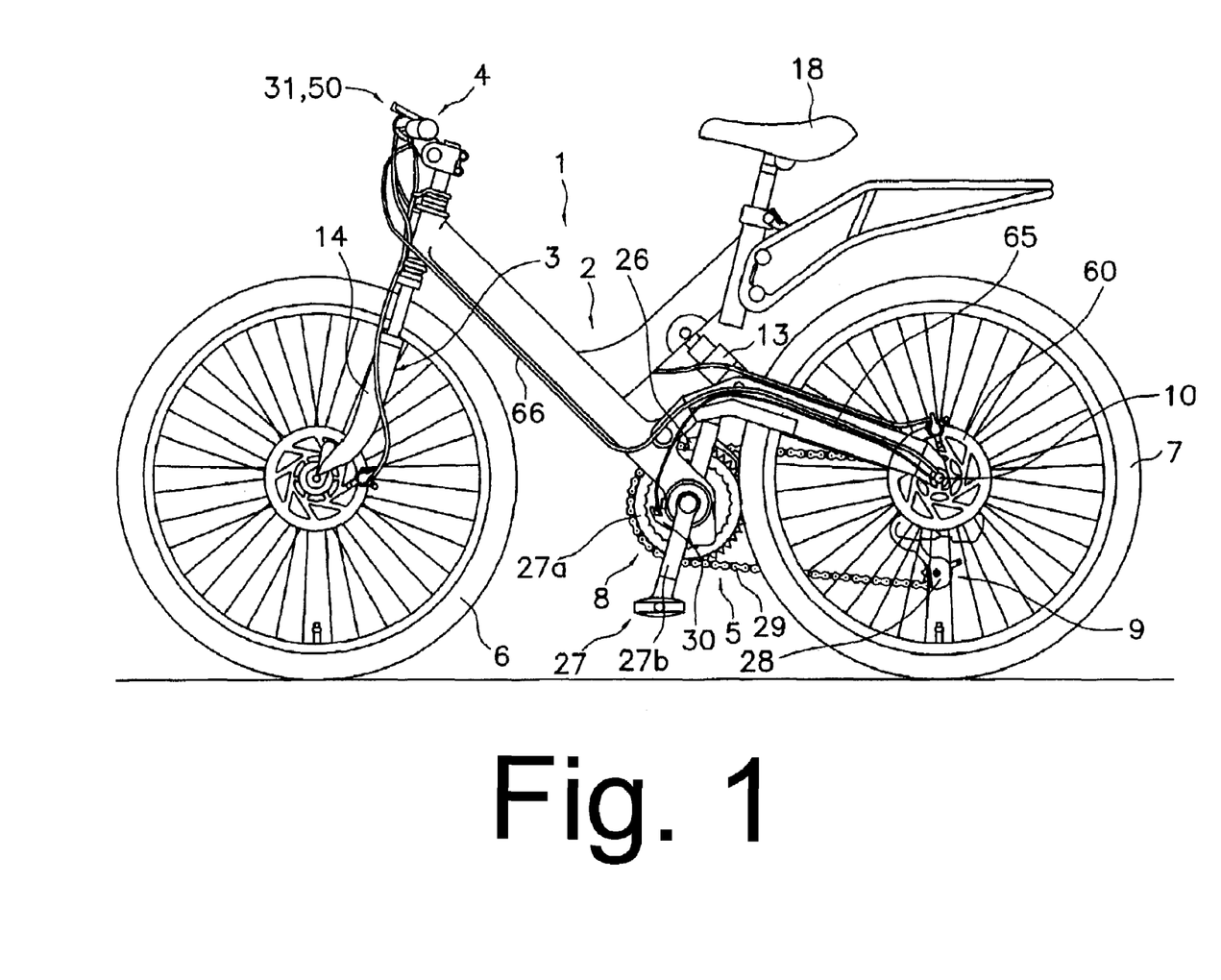
FIG. 1 is a side view of a particular embodiment of a bicycle.

FIG. 1 is a side view of a particular embodiment of a bicycle 1 in the form of a mountain bicycle having front and rear suspensions. More specifically, bicycle 1 comprises a frame body 2 made of welded irregularly-shaped tubing and a front fork 3 rotatably mounted to the front of frame body 2 for rotation around an inclined axis. A handlebar assembly 4 is mounted to the top of front fork 3, a front suspension 14 mounted to an intermediate portion of front fork 4, and a front wheel 6 is rotatably mounted to the bottom of front fork 3. A rear suspension 13 is mounted to an intermediate portion of frame body 2, and a rear wheel 7 having a hub dynamo 10 installed thereon is rotatably mounted to the rear of frame body 2. Hub dynamo 10 includes a brake disk 60 of a disk brake assembly and an internally mounted alternating current generator 19 (FIG. 3) that generates electricity when rear wheel 7 rotates.

A drive portion 5 is mounted to a lower portion of frame body 2, and a saddle 18 is mounted to an upper portion of frame body 2. Drive portion 5 comprises a front transmission 8, a rear transmission 9, a chain 29 and a controller 30 for controlling various components including front transmission 8 and rear transmission 9. Front transmission 8 comprises a front derailleur 26, a plurality of, e.g., three sprockets 27a, and a crank 27. Crank 27 is rotatably mounted at the bottom bracket portion of frame body 2, and it comprises right and left crank arms 27b, wherein sprockets 27b are mounted to the right crank arm 27b. Rear transmission 9 comprises a rear derailleur 28 and a plurality of, e.g., nine sprockets (not shown) mounted for rotation with rear wheel 7. Front derailleur 26 selectively engages chain 29 with one of the plurality of front sprockets 27a, and rear derailleur 28 engages chain 29 with one of the plurality of rear sprockets.

Controller 30 is mounted, for example, at the bottom bracket portion of frame body 2. Controller 30 is connected to alternating current generator 19 via a cord 65. Controller 30 is powered by electrical power generated by alternating current generator 19 and uses the power generated by alternating current generator 19 to operate front derailleur 26 and rear derailleur 28 through other connecting cords (not shown).

Figure 2:
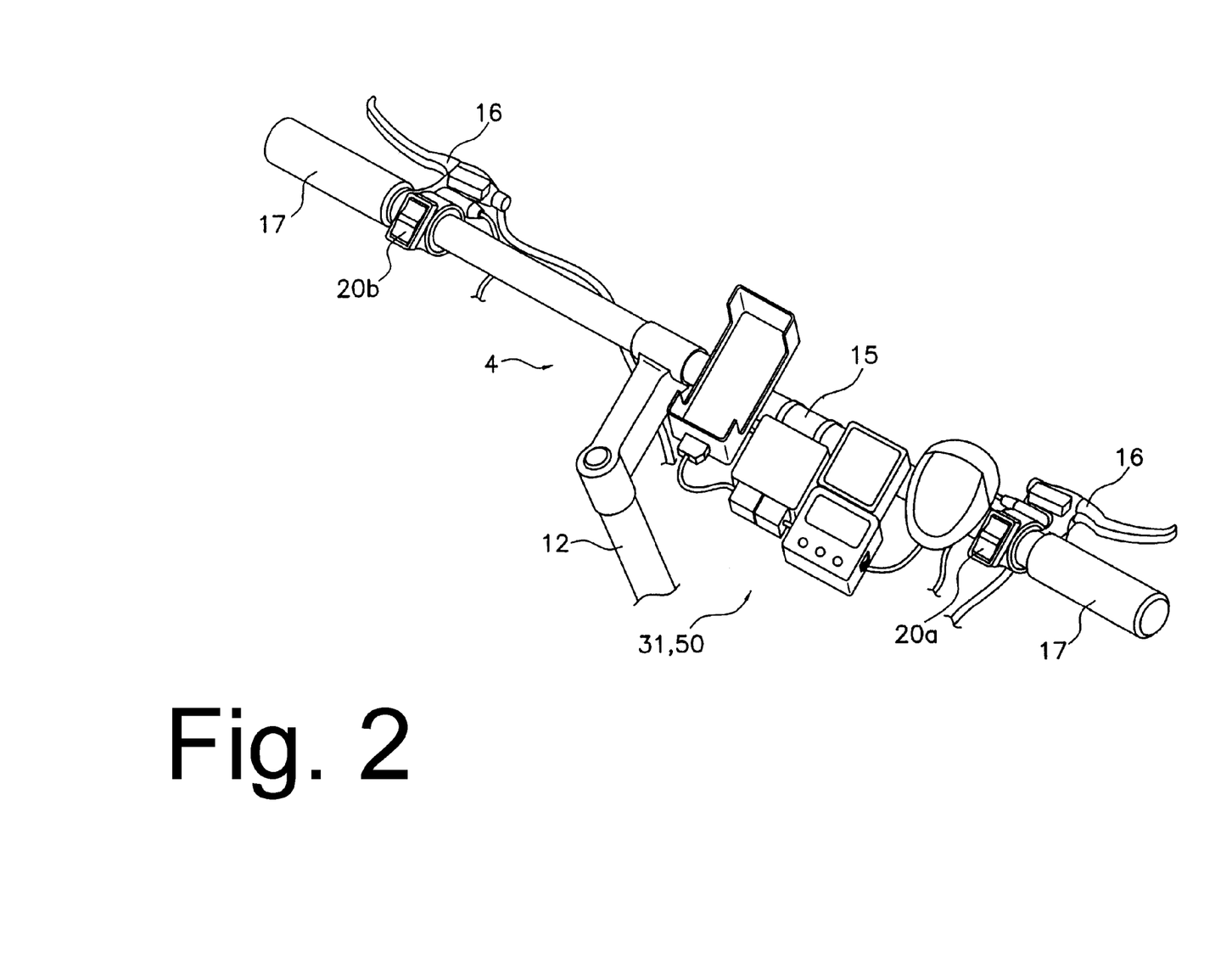
FIG. 2 is a detailed view of components mounted to the bicycle handlebar.

As shown in FIG. 2, a handlebar stem 12 is affixed to the upper end of front fork 3, and a handlebar 15 is affixed to the upper portion of handlebar stem 12. A brake lever 16 and a grip 17 are disposed at each end of handlebar 15. A shift switch 20a is disposed at the right side brake lever 16 for commanding the operation of rear transmission 9, and a shift switch 20b is disposed at the left side brake lever 16 for commanding the operation of front transmission 8. When shift switch 20a or 20b is operated, a control signal from shift switch 20a or 20b is processed by controller 30, and front transmission 8 or rear transmission 9 is operated to engage chain 29 with a desired sprocket combination.

Figure 4:
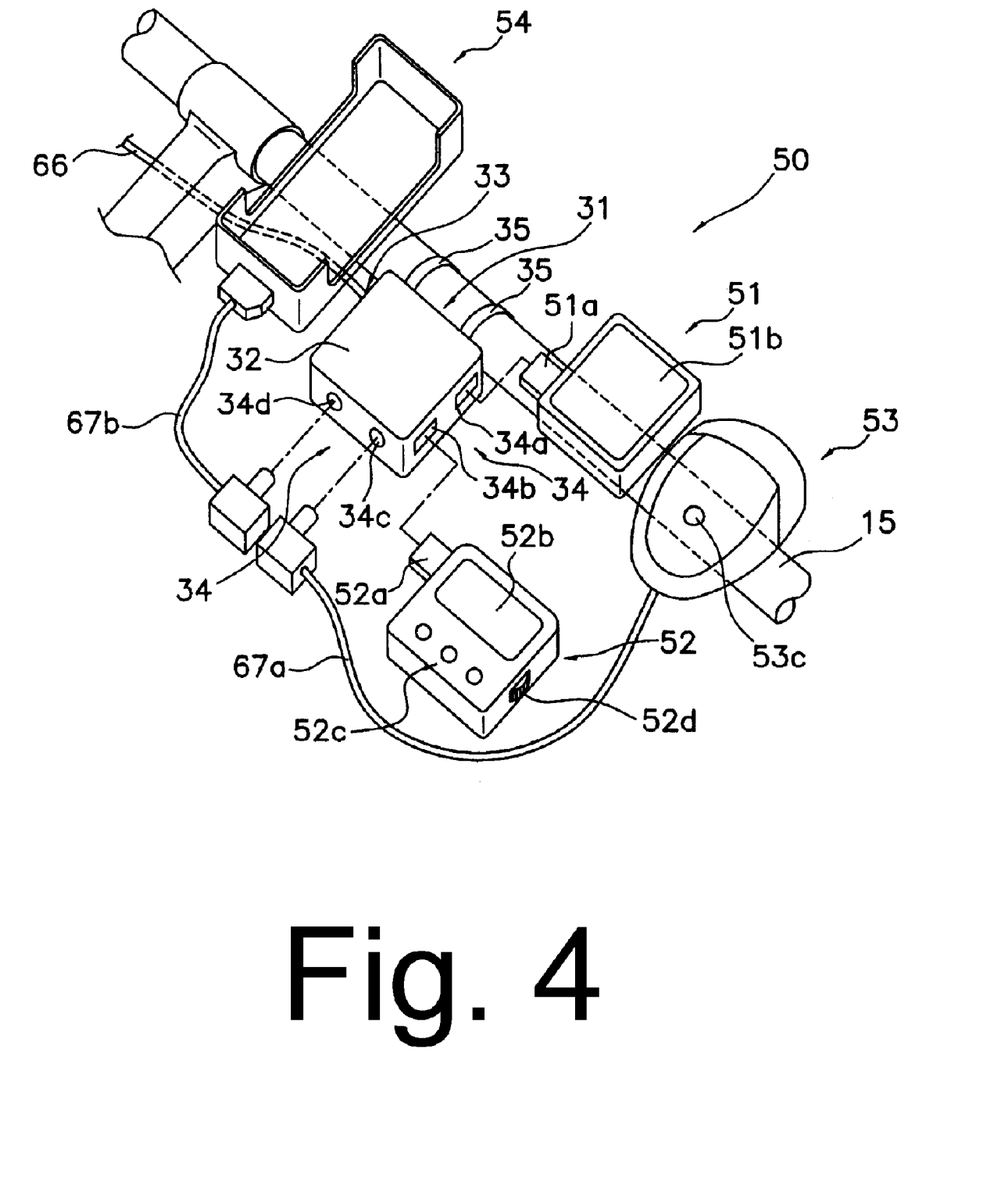
FIG. 4 is a view showing how components are connected to an electrical component holder.

An electrical component holder 31 is mounted on handlebar 15 between handlebar stem 12 and shift switch 20a. Electrical component holder 31 is connected to alternating current generator 19 through connecting cord 66. Electrical component holder 31 supplies various electrical signals, such as power or other electrical signals, from alternating current generator 19 of hub dynamo 10 to a plurality of electrical components 50. As shown in FIG. 4 electrical component holder 31 comprises a mounting member in the form of a housing 32, an input portion 33 and an output portion 34. A mounting member 35 detachably mounts housing 32 to handlebar 15. Connecting cord 66 is connected to input portion 33. Output portion 34 comprises first to fourth output portions 34a, 34b, 34c and 34d, wherein first and second output portions 34a and 34b are female external terminals having a rectangular shape, and third and fourth output portions 34c and 34d are male external terminals having a circular shape.

Figure 3:
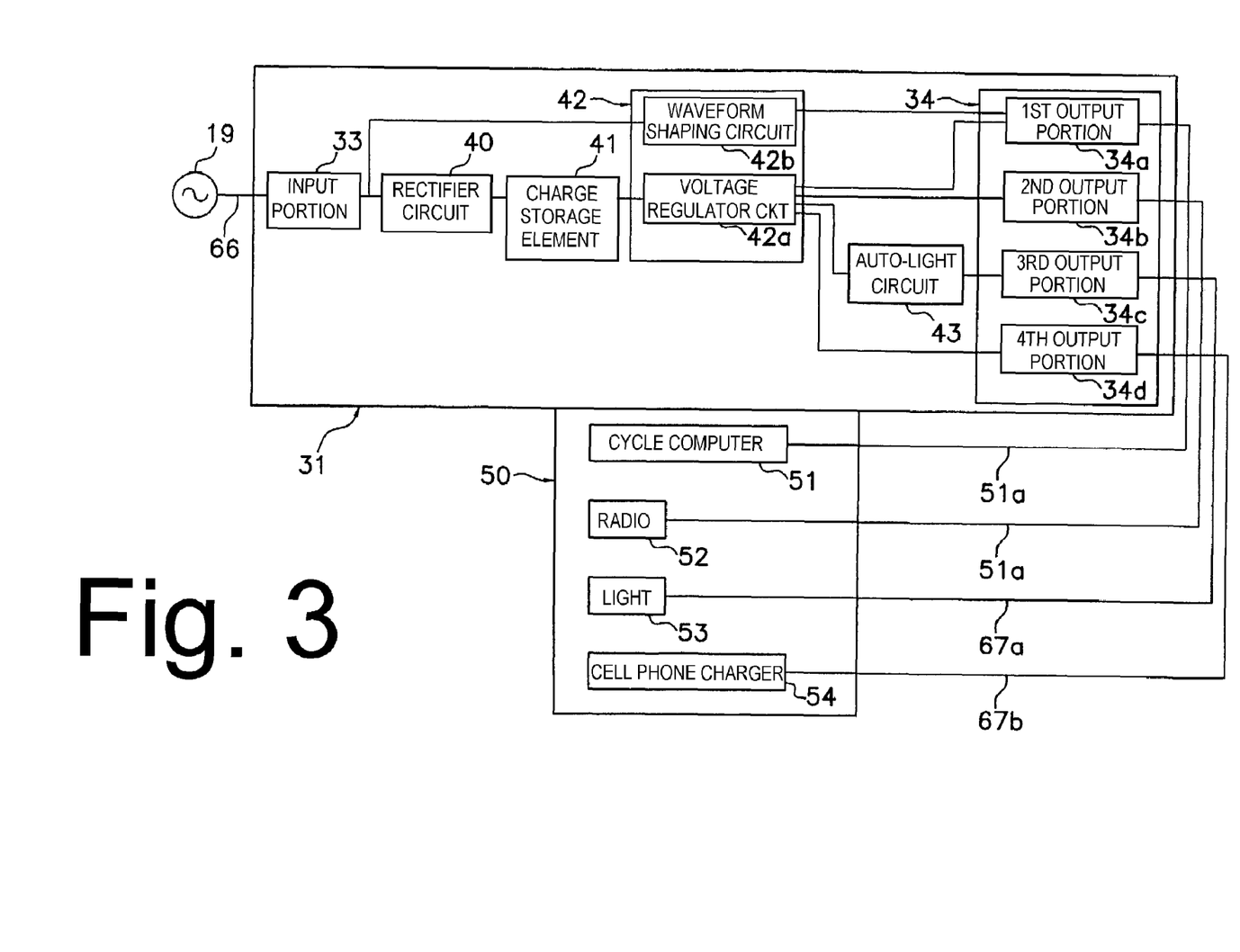
FIG. 3 is a schematic block diagram of a particular embodiment of an apparatus for providing electrical signals to bicycle components.

As shown in FIG. 3, a rectifier circuit 40, a charge storage element 41, a regulator circuit 42, and an auto-light circuit 43 are housed within electrical component holder 31. Rectifier circuit 40 converts AC power from alternating current generator 19 received by input portion 33 into DC power. Rectified DC power is output by rectifier circuit 40 to charge storage element 41. Charge storage element 41 may comprise a large capacity capacitor, for example, that stores the DC power that has been rectified by rectifier circuit 40. Charge storage element 41 also could comprise a secondary cell such as a nickel-cadmium cell, lithium ion cell, or nickel-hydrogen cell. DC power stored by charge storage element 41 is supplied to voltage regulator circuit 42a of regulator circuit 42.

Regulator circuit 42 regulates power and other signals into properly configured signals that can be used by each of a plurality of electrical components 50. In this embodiment, the plurality of electrical components 50 comprise a cycle computer 51, a radio 52, a light 53, and a cell phone charger 54. Regulator circuit 42 comprises a voltage regulator circuit 42a and a waveform shaping circuit 42b. Voltage regulator circuit 42a regulates the DC power supplied by charge storage element 41 to a properly configured predetermined voltages, and it supplies the predetermined voltages to first output portion 34a, to second output portion 34b, to an auto-light circuit 43, and to fourth output portion 34d. Auto-light circuit 43 uses a signal from an ambient light sensor (not shown) to automatically turn light 53 on and off. To do this, auto-light circuit 43 selectively supplies DC power from voltage regulator circuit 42a to third output portion 34c in response to the signal from the ambient light sensor. In this embodiment, DC voltage supplied by charge storage element 41 is regulated by voltage regulator circuit 42a to 1.2 V DC power output to first output portion 34a, to 3.0 V DC power output to second output portion 34b, to 3.5 V DC power output to auto-light circuit 43, and to 3.7 V DC power output to fourth output portion 34d.

Waveform shaping circuit 42b converts the electrical signal (e.g., a sine wave) from alternating current generator 19 into a pulsed signal (e.g., a rectangular wave). This pulsed signal is output from waveform shaping circuit 42b to first output portion 34a.

As noted above, the plurality of electrical components 50 include, for example, a cycle computer 51, a radio 52, a light 53, and a cell phone charger 54. Cycle computer 51 has a male connector terminal 51a that detachably connects to first output portion 34a so that cycle computer 51 is directly attached to housing 32. Cycle computer 51 has a liquid crystal display portion 51b capable of displaying travel information of various kinds. A control portion (not shown) comprising a microcomputer is housed in cycle computer 51. The control portion derives travel information of various kinds (e.g. travel velocity or trip distance) from the pulsed signals received from waveform shaping circuit 42b through first output portion 34a, and the travel information is displayed on liquid crystal display portion 51b.

Radio 52 has a male connector terminal 52a that detachably connects to second output portion 34b so that radio 52 is directly attached to housing 32. Radio 52 has a liquid crystal display portion 52b capable of displaying various bands (AM, FM etc.) and various frequencies, a plurality of control buttons 52c for selecting the various bands and various frequencies, and a volume adjustment knob 52d.

Light 53 and cell phone charger 54 are detachably mounted to handlebar 15. One end of a connecting cord 67a is connected to light 53, and the other end of connecting cord 67a is detachably connected to third output portion 34c. Light 53 has an on/off switch 53c so that light 53 may be selectively turned on and off. Similarly, one end of a connecting cord 67b is connected to cell phone charger 54, and the other end of connecting cord 67b is detachably connected to fourth output portion 34d. Cell phone charger 54 has a charging terminal (not shown) for charging a cell phone. More specifically, when a cell phone is placed in cell phone charger 54, the charging terminal of cell phone charger 54 comes into contact with a charging terminal (not shown) disposed on the cell phone to charge the cell phone battery.

Figure 5:
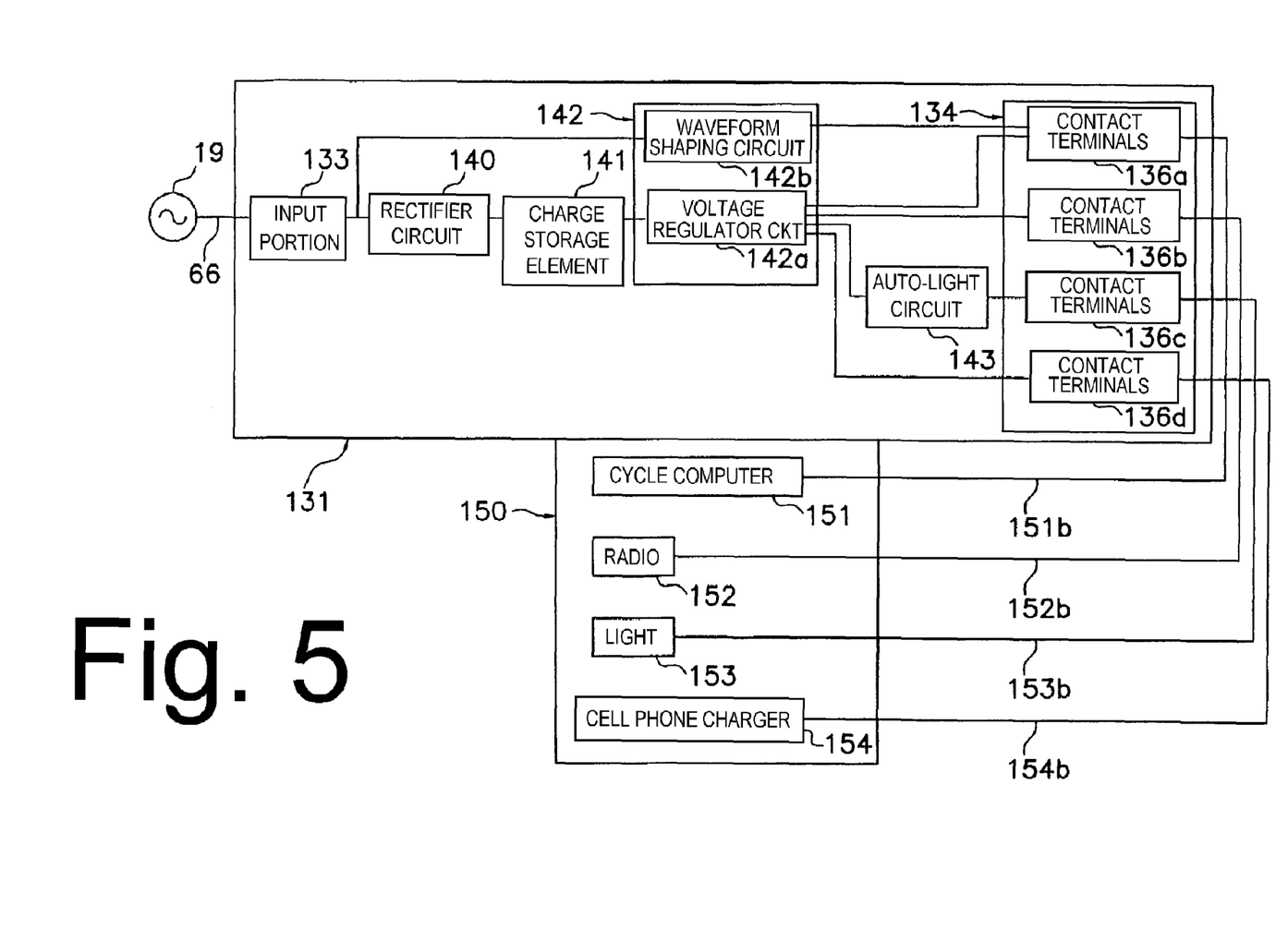
FIG. 5 is a schematic block diagram of another embodiment of an apparatus for providing electrical signals to bicycle components.
Figure 6:
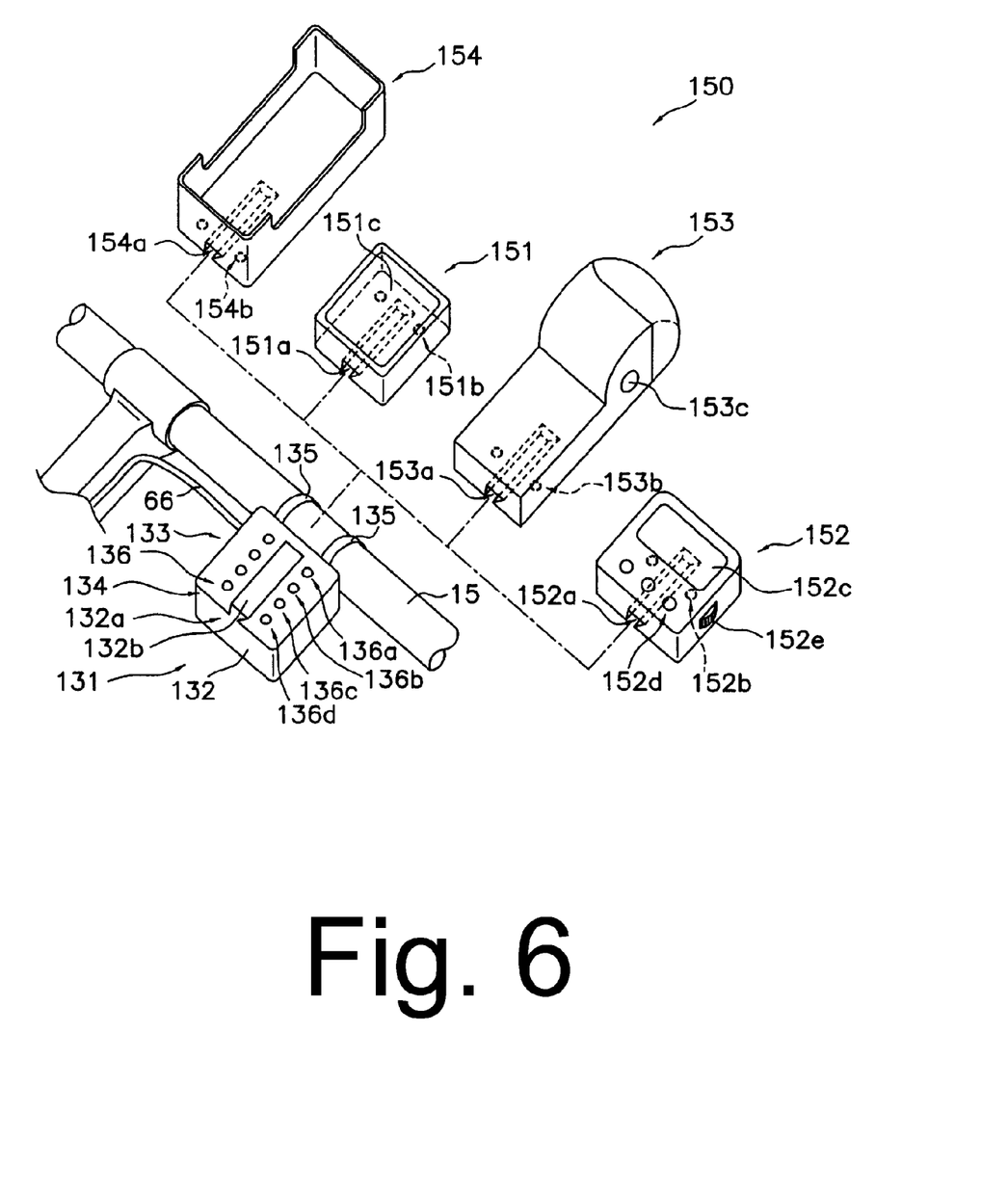
FIG. 6 is a view showing how components are connected to an electrical component holder in the embodiment shown in FIG. 5.

FIG. 5 is a schematic block diagram of another embodiment of an apparatus for providing electrical signals to bicycle components, and FIG. 6 is a view showing how components are connected to an electrical component holder 131 in the embodiment shown in FIG. 5. Electrical component holder 131 may be mounted to the handlebar 15 of bicycle 1, so only the details of electrical component holder 131 will be described.

Electrical component holder 131 supplies various electrical signals, such as power or other electrical signals, from alternating current generator 19 of hub dynamo 10 to a plurality of electrical components 150. In this embodiment, the plurality of electrical components 150 comprise a cycle computer 151, a radio 152, a light 153, and a cell phone charger 154. As shown in FIG. 6, electrical component holder 131 comprises a housing 132, an input portion 133 and an output portion 134. A mounting member 135 detachably mounts housing 132 to handlebar 15. A mounting portion 132a is disposed on the upper face of housing 132 and is structured to permit detachable mounting of any one of the plurality of electrical components 150. More specifically, mounting portion 132a has a convex portion 132b that is elongated in the front-to-back direction when the housing 132 is installed on handlebar 15. Convex portion 132b has a pair of side walls that taper outwardly as they extend upwardly from the upper face of the housing 132 (e.g., a dovetail shape).

Connecting cord 66 is connected to input portion 133 to provide signals from alternating current generator 19. Output portion 134 comprises a plurality of contact terminals 136 disposed on the upper face of housing 132. In this embodiment, the plurality of contact terminals 136 comprise eight contact terminals arranged in four pairs of contact terminals 136a, 136b, 136c and 136d. Each pair of contact terminals 136a, 136b, 136c and 136d has a contact terminal disposed on opposite sides of mounting portion 132a so that there is a column of four contact terminals disposed on each side of mounting portion 132a.

As shown in FIG. 5, a rectifier circuit 140, a charge storage element 141, a regulator circuit 142, and an auto-light circuit 143 are housed within electrical component holder 131. Rectifier circuit 140 converts AC power from alternating current generator 19 received by input portion 133 into DC power. Rectified DC power is output by rectifier circuit 140 to charge storage element 141. Charge storage element 141 may comprise a large capacity capacitor, for example, that stores the DC power that has been rectified by rectifier circuit 140. Charge storage element 141 also could comprise a secondary cell, such as a nickel-cadmium cell, lithium ion cell, or nickel-hydrogen cell. DC power stored by charge storage element 141 is supplied to voltage regulator circuit 142a of regulator circuit 142.

Regulator circuit 142 regulates power and other signals into properly configured signals that can be used by each of a plurality of electrical components 150. Regulator circuit 142 comprises a voltage regulator circuit 142a and a waveform shaping circuit 142b. Voltage regulator circuit 142a regulates the DC power supplied by charge storage element 141 to properly configured predetermined voltages, and it supplies the predetermined voltages to contact terminals 136a, to contact terminals 136b, to an auto-light circuit 143, and to contact terminals 136d. Auto-light circuit 143 uses a signal from an ambient light sensor (not shown) to automatically turn light 153 on and off. To do this, auto-light circuit 143 selectively supplies DC power from voltage regulator circuit 142a to contact terminals 136c in response to the signal from the ambient light sensor. In this embodiment, DC voltage supplied by charge storage element 141 is regulated by voltage regulator circuit 142a to 1.2 V DC power output to contact terminals 136a, to 3.0 V DC power output to contact terminals 136b, to 3.5 V DC power output to auto-light circuit 143, and to 3.7 V DC power output to contact terminals 136d.

Waveform shaping circuit 142b converts the electrical signal (e.g., a sine wave) from alternating current generator 19 into a pulsed signal (e.g., a rectangular wave). This pulsed signal is output from waveform shaping circuit 142b to contact terminals 136a.

As noted above, in this embodiment the plurality of electrical components 150 comprise, for example, a cycle computer 151, radio 152, light 153, and cell phone charger 154. Any one of these components can be detachably mounted to mounting portion 132a of housing 132. To that end, cycle computer 151, radio 152, light 153, and cell phone charger 154 each have respective concave portions 151a, 152a, 153a and 154a. Each concave portion 151a, 152a, 153a and 154a is formed as an elongated dovetail groove whose two side walls taper inwardly toward the bottom of the component. Pairs of contact terminals 151b, 152b, 153b and 154b are disposed on cycle computer 151, radio 152, light 153, and cell phone charger 154, respectively, with one contact terminal on each side of side of concave portions 151a, 152a, 153a and 154a. The pairs of contact terminals 151b, 152b, 153b and 154b are progressively offset in the lengthwise direction of their corresponding concave portions 151a, 152a, 153a and 154a. Thus, when concave portions 151a, 152a, 153a and 154a of electrical components 150 are selectively mated with the convex portion 132b of housing 132, contact terminals 151b of cycle computer 151 electrically connect with contact terminals 136a, contact terminals 152b of radio 152 electrically connect with contact terminals 136b, contact terminals 153b of light 153 electrically connect with contact terminals 136c, and contact terminals 154b of cell phone charger 154 electrically connect with contact terminals 136d.

Cycle computer 151 has a liquid crystal display portion 151c capable of displaying travel information of various kinds. A control portion (not shown) comprising a microcomputer is housed in cycle computer 151. The control portion derives travel information of various kinds (e.g. travel velocity or trip distance) from the pulsed signals received from waveform shaping circuit 142b through contacts 136a and 151b, and the travel information is displayed on liquid crystal display portion 151c.

Radio 152 has a liquid crystal display portion 152c capable of displaying various bands (AM, FM etc.) and various frequencies, a plurality of control buttons 152d for selecting the various bands and various frequencies, and a volume adjustment knob 152e. Light 153 has an on/off switch 153c so that light 153 may be selectively turned on and off. Cell phone charger 154 has a charging terminal (not shown) for charging a cell phone. As in the previous embodiment, when a cell phone is placed in cell phone charger 154, the charging terminal of cell phone charger 154 comes into contact with a charging terminal (not shown) disposed on the cell phone to charge the cell phone battery.

Figure 7:
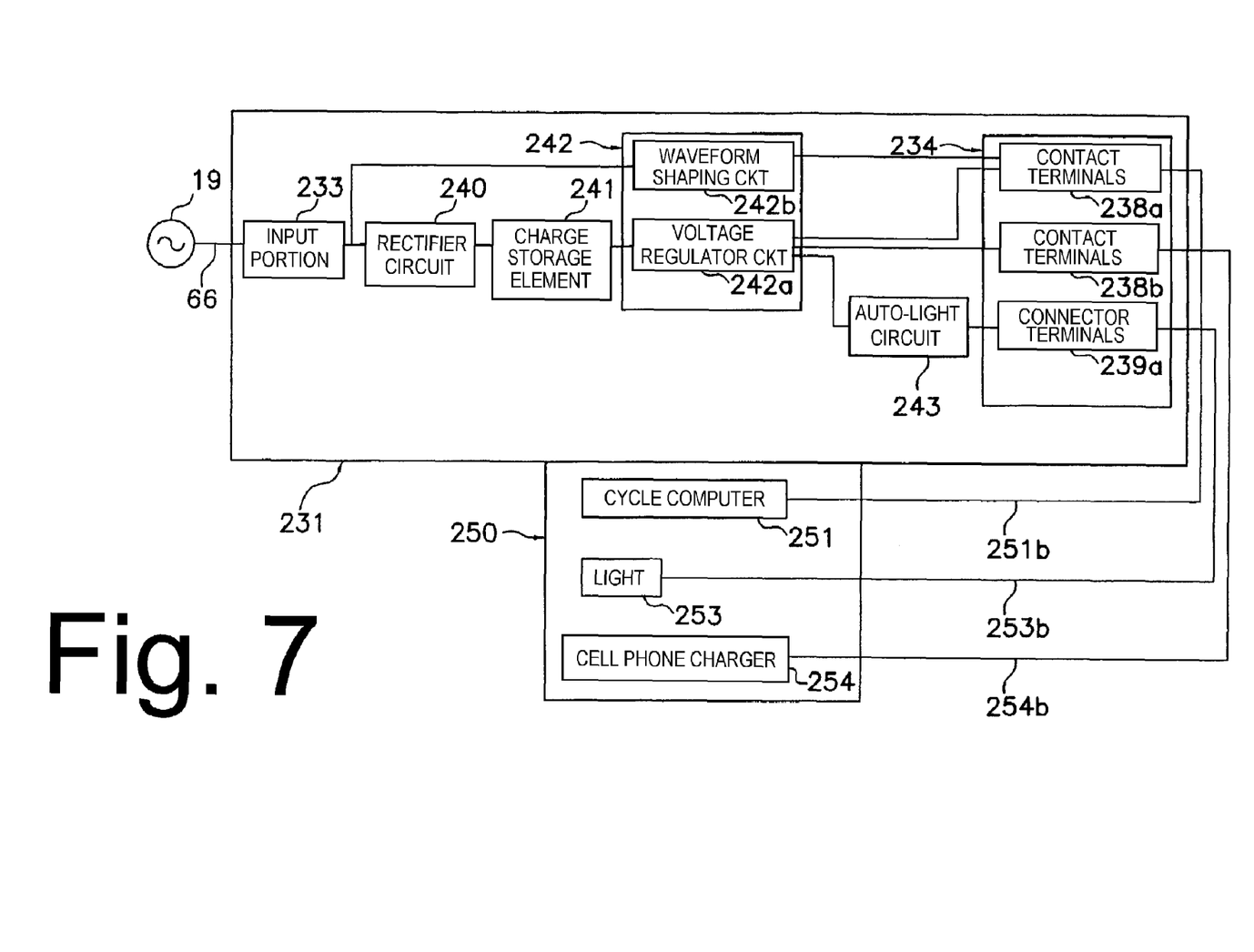
FIG. 7 is a schematic block diagram of another embodiment of an apparatus for providing electrical signals to bicycle components.
Figure 8:
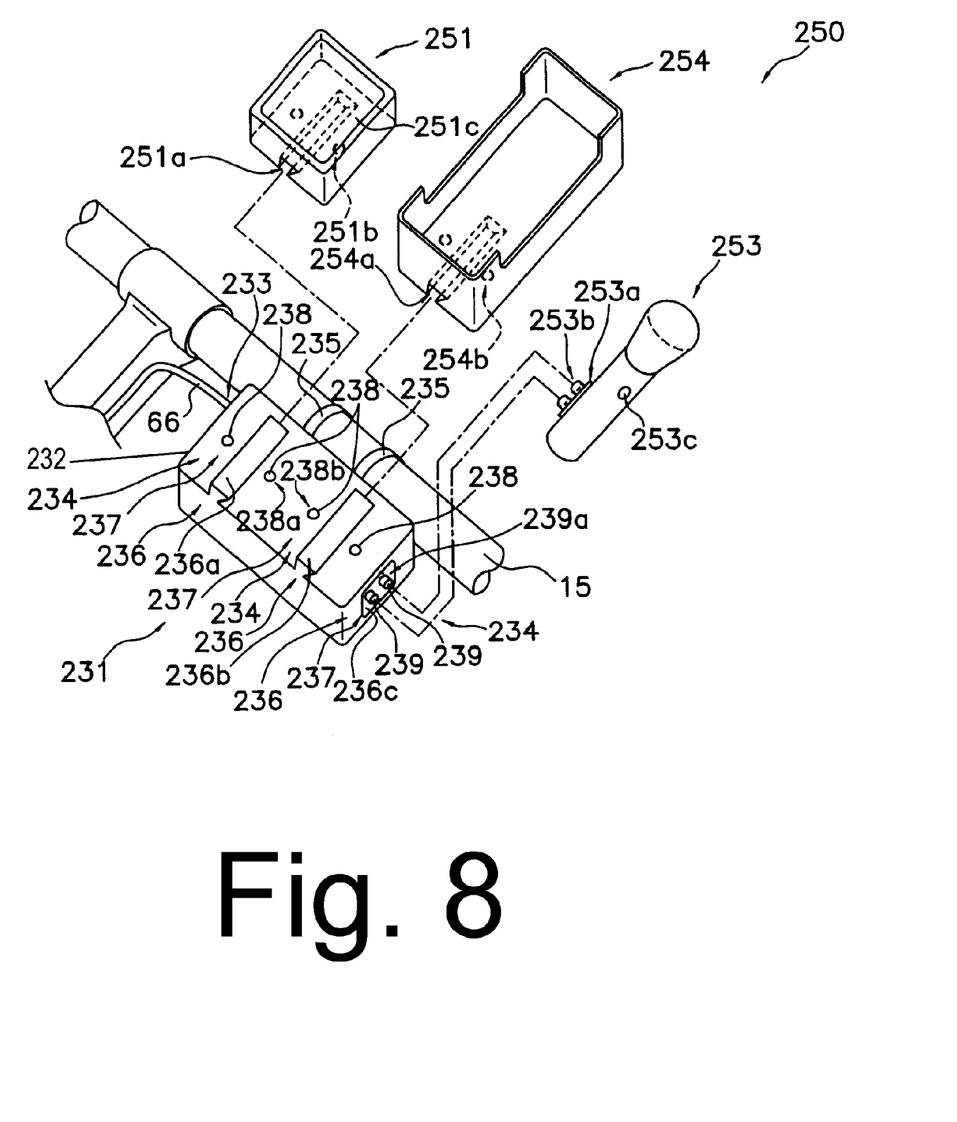
FIG. 8 is a view showing how components are connected to an electrical component holder in the embodiment shown in FIG. 7.

FIG. 7 is a schematic block diagram of another embodiment of an apparatus for providing electrical signals to bicycle components, and FIG. 8 is a view showing how components are connected to an electrical component holder 231 in the embodiment shown in FIG. 7. Electrical component holder 231 may be mounted to the handlebar 15 of bicycle 1, so only the details of electrical component holder 231 will be described.

Electrical component holder 231 supplies various electrical signals, such as power or other electrical signals, from alternating current generator 19 of hub dynamo 10 to a plurality of electrical components 250. In this embodiment, the plurality of electrical components 250 comprise a cycle computer 251, a light 253, and a cell phone charger 254. As shown in FIG. 8 electrical component holder 231 comprises a housing 232, an input portion 233 and an output portion 234 distributed along the surface of housing 232. A mounting member 235 detachably mounts housing 232 to handlebar 15.

Connecting cord 66 is connected to input portion 133 to provide signals from alternating current generator 19. A plurality of mounting portions 236 are formed on housing 232 such that various electrical components 250 may be detachably mounted to one or more of the plurality of mounting portions 236. In this embodiment, selected ones of the plurality of electrical components 250 will be coupled to a predetermined mounting portion 236 among the plurality of mounting portions 236. To that end, the plurality of mounting portions 236 comprise two convex portions 236a and 236b and one concave portion 236c. The two convex portions 236a and 236b generally have the same structures as mounting portion 132a in the embodiment shown in FIG. 6. Concave portion 236c is formed on the side face of housing 232 when housing 232 is mounted to handlebar 15.

Output portion 234 has a plurality of external terminals 237 disposed on housing 232. In this embodiment, the plurality of external terminals 237 comprise four contact terminals 238 and two connector terminals 239. The four contact terminals 238 are arranged as two pairs of contact terminals 238a and 238b on the upper face of housing 232, wherein the pair of contact terminals 238a is configured with one contact terminal 238 on opposite sides of convex portion 236a, and the pair of contact terminals 238b is configured with one contact terminal on opposite sides of convex portion 236b. The two connector terminals 239a comprise female connector terminals formed in the side face of housing 232.

As shown in FIG. 7, a rectifier circuit 240, a charge storage element 241, a regulator circuit 242, and an auto-light circuit 243 are housed within electrical component holder 231. Rectifier circuit 240 converts AC power from alternating current generator 19 into DC power. Rectified DC power is output by rectifier circuit 240 to charge storage element 241. Charge storage element 241 may comprise a large capacity capacitor, for example, that stores the DC power that has been rectified by rectifier circuit 240. Charge storage element 241 also could comprise a secondary cell such as a nickel-cadmium cell, lithium ion cell, or nickel-hydrogen cell. DC power stored by charge storage element 241 is supplied to voltage regulator circuit 242a of regulator circuit 242.

Regulator circuit 242 regulates power and other signals into properly configured signals that can be used by each of a plurality of electrical components 250. Regulator circuit 242 comprises a voltage regulator circuit 242a and a waveform shaping circuit 242b. Voltage regulator circuit 242a regulates the DC power supplied by charge storage element 241 to properly configured predetermined voltages and it supplies the predetermined voltages to contact terminals 238a and 238b and to auto-light circuit 243. Auto-light circuit 243 uses a signal from an ambient light sensor (not shown) to automatically turn light 253 on and off. To do this, auto-light circuit 243 selectively supplies DC power from voltage regulator circuit 242a to connector terminals 239a in response to the signal from the ambient light sensor. In this embodiment, DC voltage supplied by charge storage element 241 is regulated by voltage regulator circuit 242a to 1.2 V DC power output to contact terminals 238a, to 3.5 V DC power output to auto-light circuit 143, and to 3.7 V DC power output to connector terminals 239a.

Waveform shaping circuit 242b converts the electrical signal (e.g., a sine wave) from alternating current generator 19 into a pulsed signal (e.g., a rectangular wave). This pulsed signal is output from waveform shaping circuit 242b to contact terminals 238a.

As noted above, in this embodiment the plurality of electrical components 150 comprise, for example, a cycle computer 251, a light 253 and a cell phone charger 254. Cycle computer is adapted to be mounted to mounting portion 236a, and cell phone charger 254 is adapted to be mounted to mounting portion 236b. To that end, cycle computer 251 and cell phone charger 24 each have respective concave portions 251a and 254a. Each concave portion 251a and 254a is formed as an elongated dovetail groove in the same manner as concave portions 151a and 154a in the embodiment shown in FIG. 6. Pairs of contact terminals 251b and 254b are disposed on cycle computer 251 and cell phone charger 254, respectively, with one contact terminal on each side of side of concave portions 251a and 254a, respectively. Thus, when concave portions 251a and 254a of cycle computer 251 and cell phone charger 254 are mated with the respective convex portion 236a and 236b of housing 132, contact terminals 251b of cycle computer 251 electrically connect with contact terminals 238a, and contact terminals 254b of cell phone charger 254 electrically connect with contact terminals 238b.

Light 253 includes a pair of connector terminals 253b. In this embodiment, each connector terminal 253b comprises a male connector terminal that projects outwardly from the projecting face of a convex portion 253a. Thus, when convex portion 253a of light 253 mates with concave portion 236c of mounting portion 236, connector terminals 253b of light 253 electrically connect with connector terminals 239 on housing 232. Light 253 has an on/off switch 253c so that light 253 may be selectively turned on and off.

Cycle computer 251 has a liquid crystal display portion 251c capable of displaying travel information of various kinds. A control portion (not shown) comprising a microcomputer is housed in cycle computer 251. The control portion derives travel information of various kinds (e.g. travel velocity or trip distance) on the basis of pulsed signals received from waveform shaping circuit 2142b through contacts 238a and 251b, and the travel information is displayed on liquid crystal display portion 251c.

Cell phone charger 254 has a charging terminal (not shown) for charging a cell phone. As with the previous embodiments, when a cell phone is placed in cell phone charger 254, the charging terminal of cell phone charger 254 comes into contact with a charging terminal (not shown) disposed on the cell phone to charge the cell phone battery.

While the above is a description of various embodiments of inventive features, further modifications may be employed without departing from the spirit and scope of the present invention. For example, in the above embodiments electrical component holders 31, 131 and 231 comprise an electric charge storage element 41, 141 and 241. However, such charge storage elements could be omitted, and power and electrical signals from the alternating current generator 19, 119 and 219 of hub dynamo 10 could be output from rectifier circuits 40, 140 and 240 to the respective voltage regulator circuits 42a, 142a and 242a without being stored.

Figure 9:
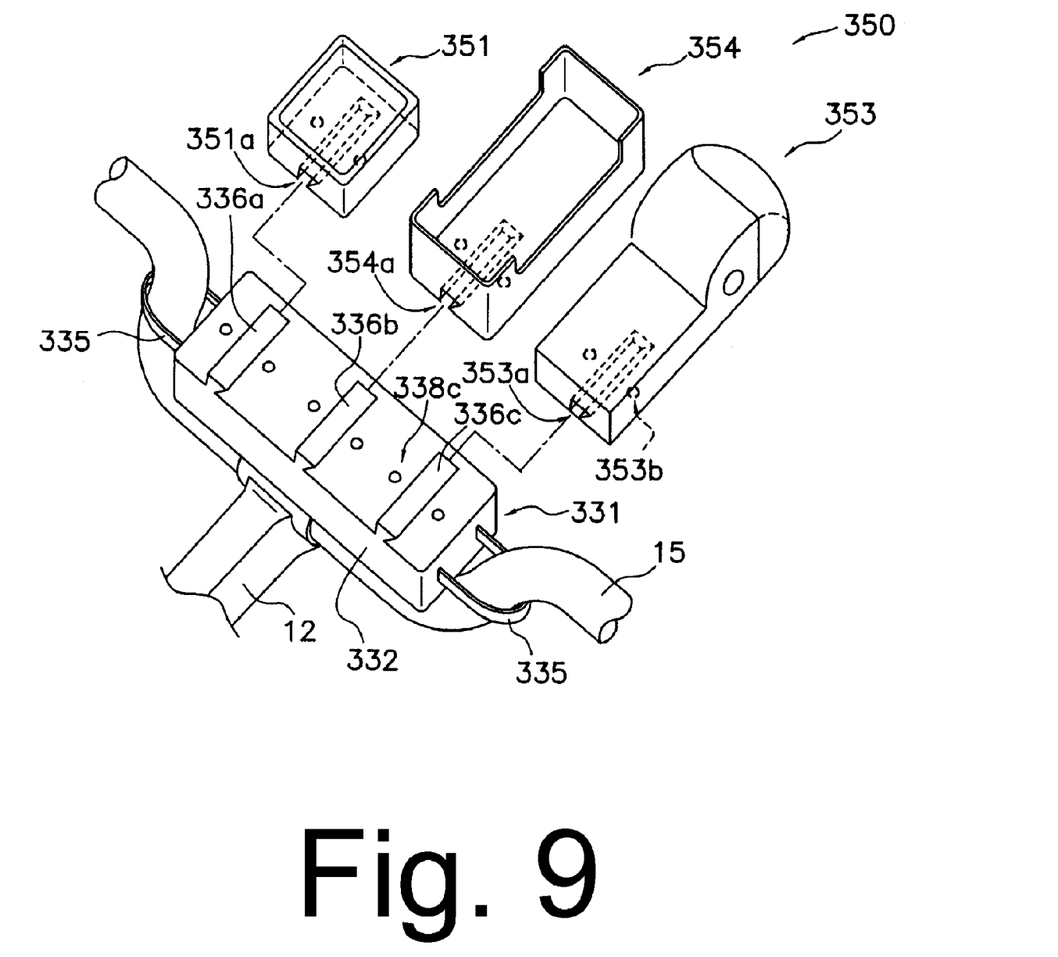
FIG. 9 is a view showing how components are connected to other embodiment of an electrical component holder in the embodiment shown in FIG. 7.

In the above embodiments, electrical component holders 31, 131 and 231 were mounted on handlebar 15 between handlebar stem 12 and shift switch 20a. However, electrical component holders 31131 and 231 could be mounted in many different locations, including locations on frame body 2. For example, as shown in FIG. 9, where handlebar 15 is a riser handlebar, an electrical component holder 331 may be located at the center portion of handlebar 15 above stem 12. In this case, mounting members 335 may be disposed on opposite sides of a housing 332 of electrical component holder 331 to mount the electrical component holder 331 to the upwardly extending portions of handlebar 15.

In FIG. 8, light 253 was shown connected to electrical component holder 231 using connectors 253b and 239. However, as shown in FIG. 9, a light 353 could be connected to electrical component holder 331 in a manner similar to a cycle computer 351 and a cell phone charger 354. In this case, a convex portion 336c could be formed on a housing 332 of electrical component holder 331 for light 353 in addition to convex portions 336a and 336b for cycle computer 351 and cell phone charger 354. In this case, a pair of second contact terminals 338c straddle convex portion 336c. To accommodate this structure, a concave portion 353a is disposed on light 353, and a pair of contact terminals 353b straddle convex portion 353a. Thus, contact terminals 353b of light 353 electrically connect with contact terminals 338c on housing 332 when concave portion 353a mates with convex portion 336c.

In the described embodiments, a hub dynamo 10 is installed on rear wheel 7. However, a hub dynamo could be installed on front wheel 6 instead. Also, many types of dynamos could be used in place of the internally mounted alternating current generator 19. For example, a rim dynamo that generates electricity through contact with the tire or rim of front wheel 6 or rear wheel 7 also could be used.

While the embodiment shown in FIG. 6 provided an example wherein concave portions of electrical components 150, 250 or 350 mated with a convex portion in order to mount the electrical components 150, 250 or 350 onto the respective housings 131, 231 and 331, many different types of mounting methods may be employed. For example, electrical components 150, 250 and 350 could be mounted onto their respective housings 131, 231 or 331 by replacing the convex portions on the housings 131, 231 and 331 with concave portions, and by replacing the concave portions on the electrical components 150, 250 and 350 with convex portions.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. An apparatus for providing electrical signals to bicycle components, wherein the apparatus comprises:
   a housing adapted to be mounted to the bicycle;
   a regulator supported by the housing to receive signals from a power supply; and
   an output disposed on the housing to supply regulated signals provided by the regulator to a plurality of electrical bicycle components external to the housing;
   wherein the output includes:
      a first external terminal to provide non-ground electrical signals to a first electrical bicycle component; and
      a separate second external terminal to provide separate non-ground electrical signals to a second electrical bicycle component.

2. The apparatus according to claim 1 wherein at least one of the first external terminal or the second external terminal is structured to be detachably connected to its corresponding first or second electrical bicycle component.

3. The apparatus according to claim 2 further comprising first and second mounting members disposed on the housing, each mounting member being structured to detachably mount a corresponding one of the first or second electrical bicycle components to the housing.

4. The apparatus according to claim 3 wherein each of the plurality of mounting members comprises one of a convex portion or a concave portion structured to engage a corresponding one of a concave portion or a convex portion on at least one of the first or second electrical bicycle components so that the at least one of the first or second electrical bicycle components cannot be detached in a direction substantially perpendicular to the surface of the mounting member from which the one of the convex portion or the concave portion extends.

5. The apparatus according to claim 3 wherein the first external terminal and the second external terminal provide different physical power characteristics from the regulator relative to each other.

6. The apparatus according to claim 3 wherein each of the first mounting member and the second mounting member projects from a surface of the housing and is structured to detachably connect at least one of first or second electrical bicycle components externally to the housing such that the at least one of the first or second electrical bicycle components cannot be detached in a direction substantially perpendicular to the surface of the housing.

7. The apparatus according to claim 6 wherein each of the first mounting member and the second mounting member has a wall that forms an abutment that faces in a direction toward the surface of the housing.

8. The apparatus according to claim 7 wherein at least one of the first mounting member and the second mounting member has a dovetail shape.

9. The apparatus according to claim 6 wherein the first external terminal is disposed on the housing at a first side of the first mounting member, wherein the second external terminal is disposed on the housing at a first side of the second mounting member, and wherein the output further includes:
   a third external terminal disposed on an opposite second side of the first mounting member to provide electrical signals to the first electrical bicycle component; and
   a fourth external terminal disposed on an opposite second side of the second mounting member to provide electrical signals to the second electrical bicycle component.

10. The apparatus according to claim 2 further comprising a mounting member disposed on the housing to detachably mount at least one of the first or second electrical bicycle components externally to the housing so that the at least one of the first or second electrical bicycle components is carried by the housing and electrical signals are provided from the at least one of the first external terminal or the second external terminal to the at least one of the first or second electrical bicycle components.

11. The apparatus according to claim 10 wherein the mounting member projects from a surface of the housing and is structured to detachably connect at least one of the first or second electrical bicycle components externally to the housing such that the at least one of the first or second electrical bicycle components cannot be detached in a direction substantially perpendicular to the surface of the housing.

12. The apparatus according to claim 11 wherein the mounting member has a wall that forms an abutment that faces in a direction toward the surface of the housing.

13. The apparatus according to claim 12 wherein the mounting member has a dovetail shape.

14. The apparatus according to claim 11 wherein the first external terminal is disposed on the housing at a first side of the mounting member, and wherein the second external terminal is disposed on the housing at an opposite second side of the mounting member.

15. The apparatus according to claim 11 wherein the first external terminal is disposed on the housing at a first side of the mounting member, and wherein the second external electrical terminal is disposed on the housing at the first side of the mounting member.

16. The apparatus according to claim 10 wherein each of the first external terminal and the second external terminal is structured to be detachably connected to its corresponding first or second electrical bicycle component.

17. The apparatus according to claim 16 wherein the first external terminal and the second external terminal provide different physical power characteristics from the regulator relative to each other.

18. The apparatus according to claim 10 wherein the at least one of the first external terminal or the second external terminal comprises a contact terminal structured to contact a complementary contact terminal on its corresponding first or second electrical bicycle component when the corresponding first or second electrical bicycle component is mounted to the housing.

19. The apparatus according to claim 10 wherein a surface of the mounting member comprises one of a convex portion or a concave portion structured to engage a corresponding one of a concave portion or a convex portion on at least one of the first or second electrical bicycle components so that the at least one of the first or second electrical bicycle components cannot be detached in a direction substantially perpendicular to the surface of the mounting member from which the one of the convex portion or the concave portion extends.

20. The apparatus according to claim 1 wherein signals communicated from the regulator to the first external terminal are adapted to be communicated to a display.

21. The apparatus according to claim 20 wherein the first external terminal is structured to communicate a data signal to the display.

22. The apparatus according to claim 21 further comprising a signal input disposed on the housing and structured to receive a signal from outside of the housing.

23. The apparatus according to claim 22 further comprising a waveform shaping circuit supported by the housing, wherein the waveform shaping circuit receives the signal from the signal input and provides a shaped signal as the data signal to the first external terminal.

24. The apparatus according to claim 23 wherein the signal input is structured to receive a signal from an alternating current generator.

25. The apparatus according to claim 24 wherein the regulator receives the signal from the alternating current generator and uses the signal from the alternating current generator to provide power to the first external terminal to power the display.

26. The apparatus according to claim 25 further comprising a power storage element supported by the housing for storing power from the alternating current generator.

27. The apparatus according to claim 1 further comprising an input disposed on the housing to receive power from an external power supply and to supply the power from the external power supply to the regulator.

28. The apparatus according to claim 27 wherein the input is adapted to receive power from an alternating current generator.

29. The apparatus according to claim 28 further comprising a power storage element supported by the housing for storing power from the alternating current generator.

30. The apparatus according to claim 28 wherein the plurality of electrical bicycle components comprise a radio, a cell phone charger and a light.

31. The apparatus according to claim 1 wherein the output comprises a plurality of power communication paths, wherein a first power communication path connected to the first external terminal provides a physically different power characteristic from the regulator than a second power communication path connected to the second external terminal.

32. The apparatus according to claim 1 wherein each first and second external terminal provides a detachable connection to its respective first and second electrical bicycle component.

33. The apparatus according to claim 1 wherein the regulator includes a waveform shaping circuit structured to convert an electrical signal from an alternating current generator into a pulsed signal.

34. The apparatus according to claim 1 further comprising an auto-light circuit supported by the housing to provide signals through the first external terminal to automatically turn a light on and off.

35. The apparatus according to claim 1 wherein the regulator is disposed within the housing.

36. The apparatus according to claim 1 wherein the non-ground electrical signals provided from the regulator by the first external terminal are different from the non-ground electrical signals provided from the regulator by the second external terminal.

37. The apparatus according to claim 1 wherein the non-ground electrical signals provided by the first external terminal and the second external terminal have a voltage in a range of from approximately 1.2 volts to approximately 3.7 volts.

38. The apparatus according to claim 1 wherein the output includes a third external terminal to provide separate non-ground electrical signals to a third electrical bicycle component, wherein the first, second and third external terminals are disposed in a row.

39. An apparatus for providing electrical signals to bicycle components, wherein the apparatus comprises:
   a housing adapted to be mounted to the bicycle;
   a regulator supported by the housing to receive signals from a power supply; and
   an output disposed on the housing to supply regulated signals provided by the regulator to a plurality of electrical bicycle components external to the housing;
   wherein the output includes:
      a first external terminal to provide electrical signals to a first electrical bicycle component; and
      a separate second external terminal to provide separate electrical signals to a second electrical bicycle component;
   wherein at least one of the first external terminal or the second external terminal is structured to be detachably connected to its corresponding first or second electrical bicycle component;
   first and second mounting members disposed on the housing, each mounting member being structured to detachably mount a corresponding one of the first or second electrical bicycle components to the housing;
   wherein the first and second external terminals comprise respective first and second contact terminals, wherein the first contact terminal is provided in close proximity to the first mounting member and is structured to contact a first complementary contact terminal on the first electrical bicycle component when the first electrical bicycle component is mounted to the first mounting member, and wherein the second contact terminal is provided in close proximity to the second mounting member and is structured to contact a second complementary contact terminal on the second electrical bicycle component when the second electrical bicycle component is mounted to the second mounting member.

40. An apparatus for providing electrical signals to bicycle components, wherein the apparatus comprises:
   a housing adapted to be mounted to the bicycle;
   a regulator supported by the housing to receive signals from a power supply; and
   an output disposed on the housing to supply regulated signals provided by the regulator to a plurality of electrical bicycle components external to the housing;
   wherein the output includes:
      a first external terminal to provide electrical signals to a first electrical bicycle component; and
      a separate second external terminal to provide separate electrical signals to a second electrical bicycle component;
   wherein at least one of the first external terminal or the second external terminal is structured to be detachably connected to its corresponding first or second electrical bicycle component;
   first and second mounting members disposed on the housing, each mounting member being structured to detachably mount a corresponding one of the first or second electrical bicycle components to the housing;
   wherein the first and second external terminals comprise respective first and second connector terminals, wherein the first connector terminal is provided in close proximity to the first mounting member and is structured to engage a first complementary connector terminal on the first electrical bicycle component when the first bicycle component is mounted to the first mounting member, and wherein the second connector terminal is provided in close proximity to the second mounting member and is structured to engage a second complementary connector terminal on the second electrical bicycle component when the second electrical bicycle component is mounted to the second mounting member.

41. The apparatus according to claim 40 wherein the first connector terminal comprises one of a male or a female connector terminal, and wherein the first complementary connector terminal comprises the other one of the male or the female connector terminal.

42. An apparatus for providing electrical signals to bicycle components, wherein the apparatus comprises:
   a housing adapted to be mounted to the bicycle;
   a voltage regulator supported by the housing to receive power from a power supply and to provide first and second different non-ground voltages, each of which is adapted to power respective first and second electrical bicycle components; and
   first and second external output terminals disposed on the housing to supply the respective first and second different non-ground voltages from the regulator to the respective first and second electrical bicycle components external to the housing.

43. An apparatus for providing electrical signals to bicycle components, wherein the apparatus comprises:
   a housing adapted to be mounted to the bicycle;
   a regulator supported by the housing to receive signals from a signal source;
   a plurality of mounting members disposed on the housing to directly attach a corresponding plurality of electrical bicycle components to the housing; and
   an external output terminal disposed on the housing in close proximity to each mounting member to supply regulated non-ground signals provided by the regulator to corresponding ones of the plurality of electrical bicycle components mounted to the plurality of mounting members.

44. An apparatus for providing electrical signals to bicycle components, wherein the apparatus comprises:
   a housing adapted to be mounted to the bicycle;
   a regulator supported by the housing to receive signals from a signal source;
   a mounting member adapted to directly mount each one of a plurality of electrical bicycle components to that mounting member, each electrical bicycle component having different non-ground signal requirements; and
   an external output terminal disposed on the housing to supply regulated non-ground signals provided by the regulator to each of the plurality of electrical bicycle components when individually mounted to the mounting member.

* * * * *